United States Patent
Sharma et al.

(10) Patent No.: US 11,640,385 B1
(45) Date of Patent: May 2, 2023

(54) CROSS-CHANNEL CONSISTENT USER CONTENT

(71) Applicant: American Express Travel Related Services Company, Inc., New York, NY (US)

(72) Inventors: Mansi Sharma, Edison, NJ (US); Venkatesh Nagarajan, Scottsdale, AZ (US); Xiangzhen Kong, Hoboken, NJ (US); Neha Arya, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 17/125,527

(22) Filed: Dec. 17, 2020

(51) Int. Cl.
*G06F 16/23* (2019.01)
*G06F 16/9537* (2019.01)
*G06F 16/9535* (2019.01)
*G06F 21/62* (2013.01)

(52) U.S. Cl.
CPC ...... *G06F 16/2365* (2019.01); *G06F 16/9535* (2019.01); *G06F 16/9537* (2019.01); *G06F 21/6245* (2013.01)

(58) Field of Classification Search
CPC ............. G06F 16/2365; G06F 16/9535; G06F 16/9537
See application file for complete search history.

(56) References Cited

U.S. PATENT DOCUMENTS

| | | | | |
|---|---|---|---|---|
| 2003/0217333 | A1* | 11/2003 | Smith | G06Q 30/00 715/255 |
| 2009/0157449 | A1* | 6/2009 | Itani | G06Q 30/0201 705/7.29 |
| 2013/0238745 | A1* | 9/2013 | Ramachandran | H04N 21/2396 709/217 |
| 2021/0092559 | A1* | 3/2021 | Hartzell | G06F 16/9538 |

\* cited by examiner

*Primary Examiner* — Taelor Kim
(74) *Attorney, Agent, or Firm* — Thomas Horstemeyer, LLP (57) ABSTRACT

Disclosed are various embodiments for providing consistent user content. A first content request is received from a browser. Personalized content is then generated based at least in part on the first content request. The personalized content is returned to the browser and saved in association with the unique device identifier and the session identifier. A second content request is then received from the browser, the second content request including personally identifying information (PII). The saved personalized content is searched and alternative personalized content is then generated using the personally identifying information (PII). An inconsistency between the personalized content and the alternative personalized content is then resolved to generate consistent personalized content. Finally, the consistent personalized content is provided to the browser in response to the second request.

20 Claims, 5 Drawing Sheets

CROSS-CHANNEL CONSISTENT USER CONTENT

BACKGROUND

Users often receive different content based on the channel through which they arrive at a website. For example, a user may receive one version of content if they are referred to the website from a third-party website. Meanwhile, the user may receive a second version of the content if they visit the website while logged in, and a third version of the content if they visit the website while not authenticated with the website. Accordingly, the user may suffer from inconsistent user experiences.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for presenting content to users in a consistent manner across channels. As a user browses a website, they can be provided with content that is personalized. The more information that the website has about the user, the more appropriate and personalized the content can be. However, users may visit the website through different channels, such that the web site does not always accurately identify the user on each visit. As a result, the user may receive content that is more or less personalized according to whether the user has recently visited the website, is visiting the website while logged in, etc. This can lead to inconsistent user experiences. For example, when a user visits a website, they could receive general or generic offers for goods or services, while they might receive more favorable or more tailored offers for goods or services if they were logged in and the website could verify the identity and qualifications of the user.

However, some websites may have strict privacy controls regarding the disclosure or sharing of the personal information of a user. For example, a financial institution may be allowed to receive and forward personal information to a credit bureau for the purpose of evaluating whether to offer credit or other banking or financial services (e.g., credit or charge cards). But the financial institution may be prohibited from storing this personal information, using it for other purposes, or sharing it with other computer systems under the control of the financial institution. Accordingly, the approaches described herein allow for the details of content that a user is authorized to receive (e.g., financial services or product offers) to be shared between systems without storing or sharing the personal information of the user. This not only preserves the privacy of a user, but also provides security improvements by limiting the amount of information that could be disclosed in the event of a data breach.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1A:
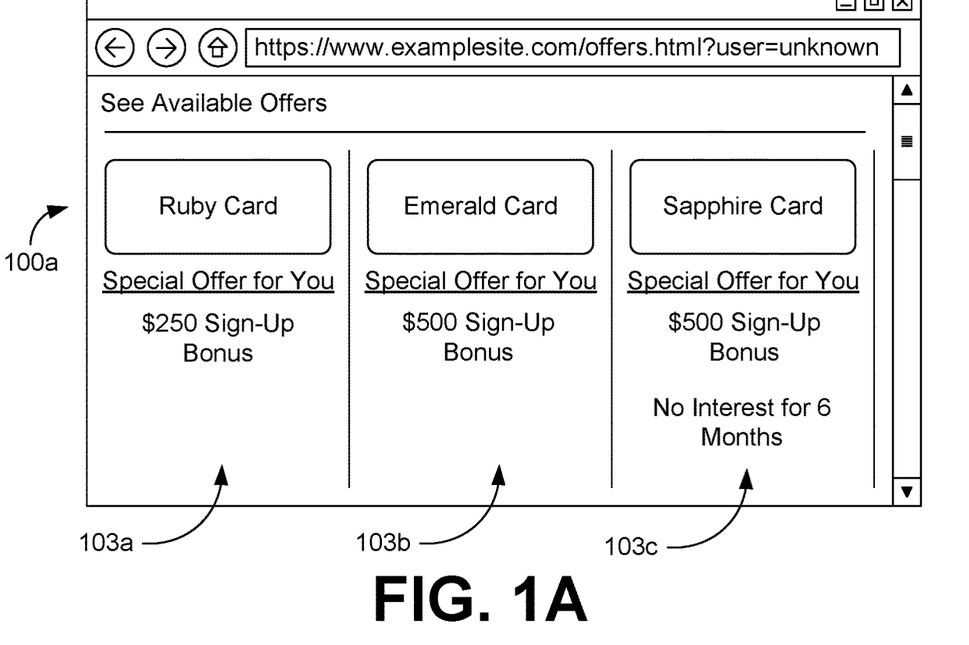
FIGS. 1A-1D are pictorial diagrams of an example user interface rendered by a client in the network environment of FIG. 2 according to various embodiments of the present disclosure.

FIG. 1A illustrates a user interface 100a according to various embodiments of the present disclosure. The user interface 100a could represent any application interface displayed to a user, such as a web page rendered by a web browser, an application screen, etc. As shown here, the user interface 100a shows personalized content to the user, such as personalized offer 103a, personalized offer 103b, and personalized offer 103c (collectively "personalized offers 103"). Although the identity of the user may not be known specifically to the entity providing the personalized offers 103, personalized offers 103 can still be tailored based on such factors as the geographic location of the device.

Figure 1B:
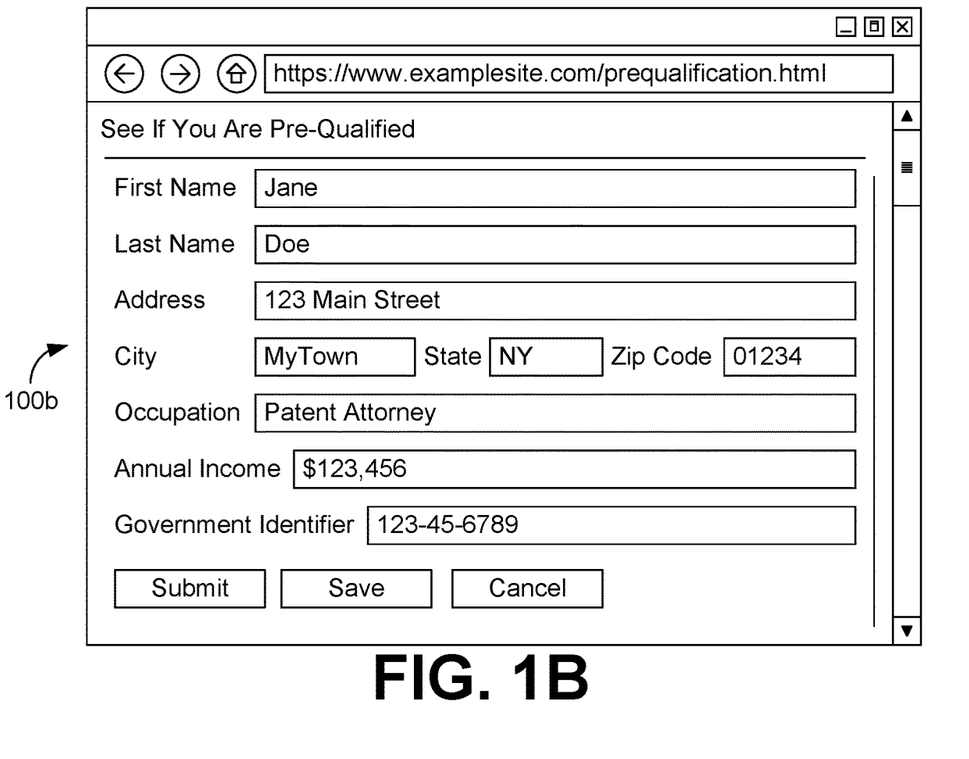

FIG. 1B illustrates a user interface 100b according to various embodiments of the present disclosure. Here, a user may supply personal information through the user interface 100b, such as the legal name of the user, his or her current address, his or her current occupation, his or her current annual income, and/or his or her government identifier (e.g., social security number, driver's license number, passport number, etc.). The user may arrive at the user interface 100b from the user interface 100a by selecting a personalized offer 103 and, in response, being presented with the user interface 100b. The personal information could then be submitted in order to confirm that the user is eligible for the selected personalized offer 103 and/or is eligible for additional or improved personalized offers 103.

Figure 1C:
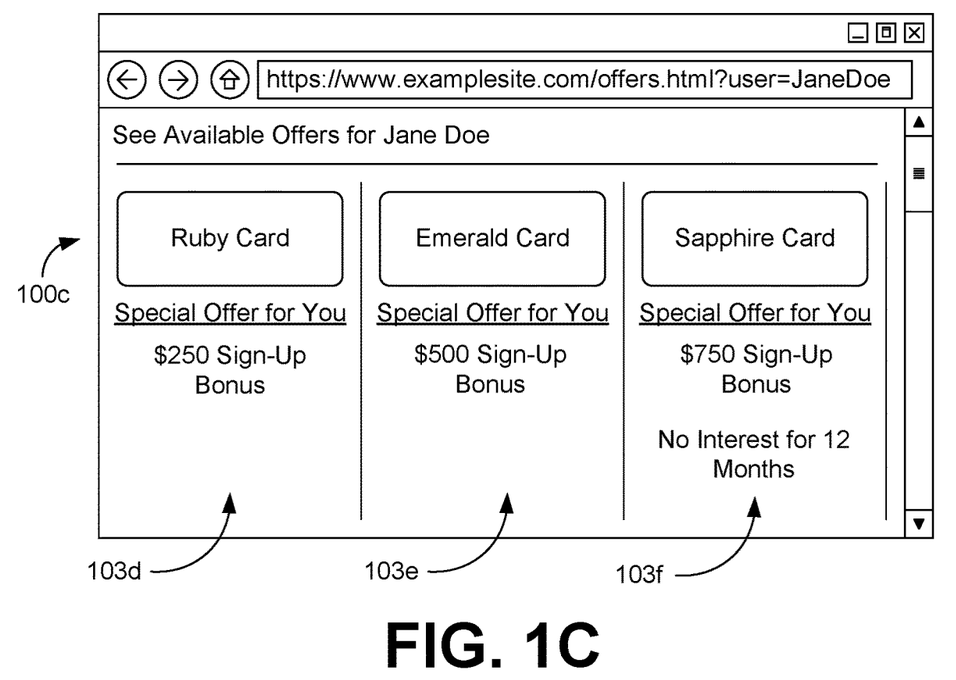

FIG. 1C illustrates a user interface 100c according to various embodiments of the present disclosure. Here, a user may be presented with updated personalized offers 103 (depicted as personalized offers 103d, 103e, and 103f) in response to submitting his or her personal information through the user interface 100b. Because the user is currently known to the entity, and more information about the user is known to the entity, one or more of the personalized offers 103d, 103e, and 103f can be presented that show larger bonuses, longer interest free periods, etc.

Figure 1D:
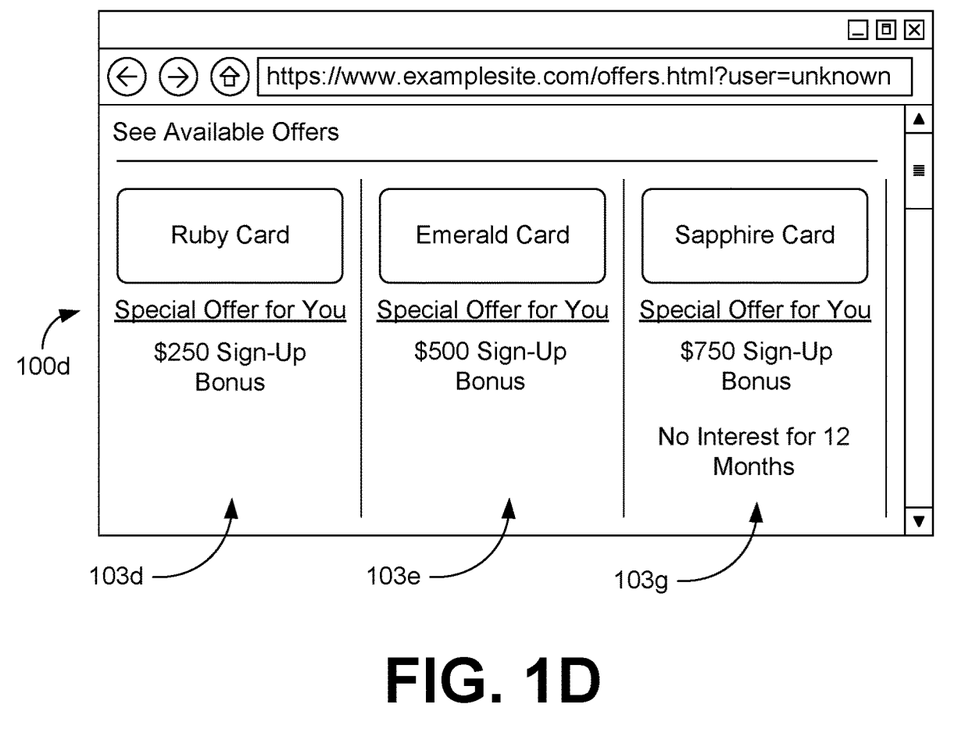

FIG. 1D illustrates a user interface 100d according to various embodiments of the present disclosure. The user interface 100d may be similar to the user interface 100a in that the user has not authenticated with the entity providing the user interface 100d. For example, if a user has previously visited the website of the entity and provided personal information (as depicted in FIG. 1B), only to subsequently leave the website (e.g., due to closing the browser window), the user could return to the website without being logged in or authenticated. However, because the user has previously provided personal information, the user can still be presented with the personalized offers 103d, 103e, and/or 103f instead of the personalized offers 103a, 103b, and/or 103c.

Figure 2:
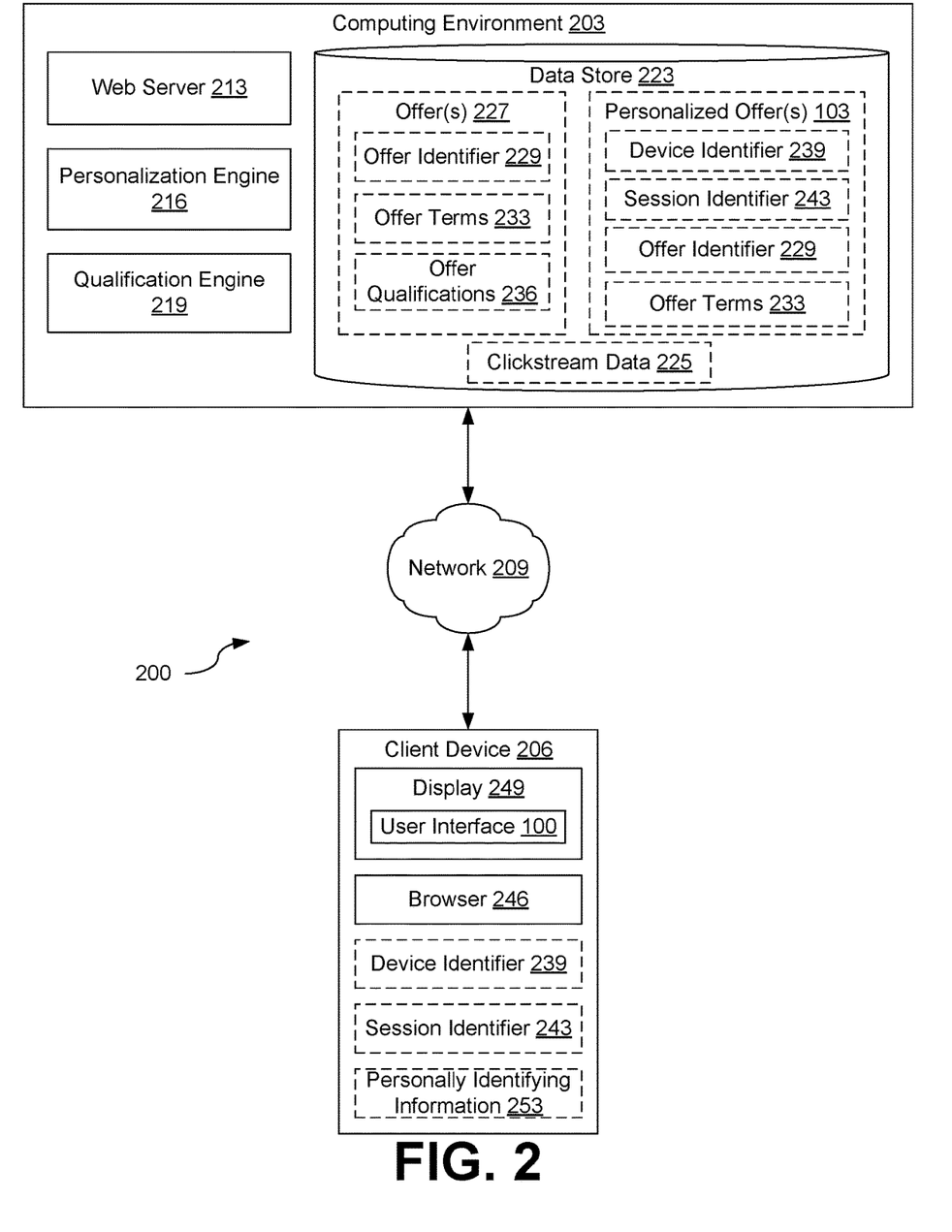
FIG. 2 is a drawing of a network environment according to various embodiments of the present disclosure.

With reference to FIG. 2, shown is a network environment 200 according to various embodiments. The network environment 200 can include a computing environment 203 and a client device 206, which can be in data communication with each other via a network 209.

The network 209 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 can include a web server 213, a personalization engine 216, and a qualification engine 219. Although depicted separately for purposes of clarity, the web server 213, the personalization engine 216, and/or the qualification engine 219 can be implemented as components of the same application and/or operated by the same entity. The computing environment 203 can also execute, host, or otherwise implement other applications, services, processes, systems, engines, or functionality not discussed in detail herein.

Also, various data is stored in a data store 223 that is accessible to the computing environment 203. The data store 223 can be representative of a plurality of data stores 223, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 223 is associated with the operation of the various applications or functional entities described below. This data can include content such as click stream data 225, one or more offers 227, personalized content such as one or more personalized offers 103, and potentially other data.

The clickstream data 225 can represent a recording or recordings of a user's interactions with a web page, such as a user interface 100, by the web server 213. As a user clicks on a button, selects a hyperlink, enters text into a text field, or otherwise interacts with individual user interface elements, the interactions are provided by the browser to the web server 213. These user interactions can be saved by the webserver 213 as clickstream data 225 associated with a particular client device 206 or user of the client device 206.

An offer 227 can represent content that can be personalized for a user. Examples of offers 227 can include offers for goods or services. Offers 227 can accordingly include an offer identifier 229, one or more offer terms 233 and one or more offer qualifications 236.

The offer identifier 229 can represent any identifier that uniquely identifies an offer 227 with respect to another offer 227. Examples of offer identifiers 229 can include sequential numbers, hashes, universally unique identifiers (UUIDs), globally unique identifiers (GUIDs), etc.

The offer terms 233 represent the terms of the offer 227. For example, offer terms 223 could represent a sign-up bonus for agreeing to purchase a good or service, such as a sign-up bonus for opening a new credit card or charge card account with an issuer. As another example, offer terms 223 could represent a introductory interest rate that is guaranteed for a defined amount of time.

In some instances, an offer 227 can have multiple tiers for the same offer terms 233. For example, an offer 227 of a sign-up bonus could include a first tier that offers a lower bonus amount if a lower spending threshold is met, and a second tier that offers a higher bonus amount if a higher spending threshold is met. As another example, an offer 227 could have different time periods that an introductory interest rate could be offered or different levels of introductory interest rates. Where multiple sets of offer terms 233 are associated with a particular offer 227, the individual offer terms 233 may be represented by individual offer flags. These offer flags can reflect an identifier for a particular level, tier, or version of the offer terms 233 available.

The offer qualifications 236 can represent those conditions or qualifications which a user must satisfy in order to be eligible for an offer 227 with a particular set of offer terms 233. For example, if the offer 227 were for a credit card and the offer terms 233 were for a specific introductory interest rate or for a specific sign-up bonus, the offer qualifications 236 could specify a minimum credit score, a minimum annual income, or other factors or combination thereof which the user would need to satisfy in order to be eligible for the offer 227 with those offer terms 233. Where an offer 227 has multiple tiers, levels, or versions of offer terms 233, then the offer 227 could also have multiple respective sets of offer qualifications for each set of the offer terms 233.

A personalized offer 103 can represent content that is personalized for a user, such as an offer 227 with offer terms 233 that a user is authorized to view or receive. For example, a personalized offer 103 could represent an offer 227 for a credit card or charge card with a specific set of offer terms 233 that the user is authorized to receive according to various criteria. Accordingly, the personalized offer can include the offer identifier 229 of the offer 227, the device identifier 239 of the user who can receive the offer, and the session identifier 243 of the user to determine whether the offer is still valid to make to the user. If an offer 227 has multiple tiers, versions, or levels of offer terms 233, the personalized offer 103 can also include an identifier or indication of the tier, level, or version of the offer terms 233 that can be made to the user.

The device identifier 239 can represent any identifier that uniquely represents a client device 206 with respect to another client device 206. Examples of device identifiers 239 include persistent cookies, tokens, or other persistent data placed on the client device 206. Hardware identifiers such as serial numbers, media access control (MAC) addresses, international mobile equipment identifier (IMEI) numbers, etc. can also be used as device identifiers 239 in various embodiments of the present disclosure.

The session identifier 243 can represent a token other identifier that uniquely represents a series of related message exchanges, which are often referred to as a session. The session identifier 243 can be used to track the state of a communication or sequence of communications between the client device 206 and the webserver 213, such as when the client device 206 visits a web page hosted by the web server 213. The session identifier 243 can be used to track which offers 227 or personalized offers 103 should be presented to a user, according to various embodiments of the present disclosure. For example, if a session identifier 243 has expired or is no longer valid, then any personalized offers 103 may also have expired or otherwise be invalid. In such a situation, new personalized offers 103 should be identified and presented to the user of the client device 206.

The webserver 213 can be executed to receive requests for content from client devices 206, such as requests for web pages from the browser 246 on the client device 206. The webserver 213 can pull, request, or receive content from a number of sources, including the personalization engine 216. The webserver 213 can then package or combine the content into a web page, which can be sent to the browser 246 in response to the request received.

The personalization engine 216 can be executed to generate and save a personalized offer 103 according to various embodiments of the present disclosure. Where a user is eligible for multiple versions of the same offer 227, such as when a user is qualified for multiple tiers, levels, or versions of offer terms 233 for an offer 227, then the personalization engine 216 can resolve the inconsistent offer terms 233 to create a personalized offer 103.

The qualification engine 219 can be executed to determine which tier, level, or version of offer terms 233 for an offer 227 a user is qualified to receive, if any. In some instances, the qualification engine 219 could make this determination based on information included in the request received from the browser 246 by the web server 213, such as a geographic location associated with the internet protocol (IP) address associated with the client device 206. In other instances, the qualification engine 219 could rely on personal information submitted by the user to determine which tier, level, or version of offer terms 233 for an offer 227 a user is qualified to receive. The qualification engine 219 can use various cost-benefit and risk analysis models to make these determinations.

The client device 206 is representative of a plurality of client devices that can be coupled to the network 209. The client device 206 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 can include one or more displays 246, such as liquid crystal displays (LCDs), gas plasma-based flat panel displays, organic light emitting diode (OLED) displays, electrophoretic ink ("E-ink") displays, projectors, or other types of display devices. In some instances, the display 249 can be a component of the client device 206 or can be connected to the client device 206 through a wired or wireless connection.

The client device 206 can be configured to execute various applications, such as a browser 246 or other applications. The browser 246 can be executed in a client device 206 to access network content, such as web pages, served up by the computing environment 203 or other servers, thereby rendering a user interface 100 (e.g., user interface 100a, 100b, 100c, and/or 100d) on the display 249. To this end, the user interface 100 can include a web page or other user mechanism for obtaining user input. The client device 206 can be configured to execute applications beyond the browser 246, such as email applications, social networking applications, word processors, spreadsheets, or other applications.

Next, a general description of the operation of the various components of the network environment 200 is provided. Although the following description provides an example of the interaction between the various components of the network environment 200, it does not describe the only possible series of interactions between the various components. The operation of individual components of the network environment 200 is provided in further detail in the discussion accompanying FIGS. 3 and 4.

To begin, a user of the client device 206 can send a request for a web page to the web server 213 using the browser 246. The web server 213 can provide information from the request, such as the internet protocol (IP) address of the client device 206, to the personalization engine 216. The personalization engine 216 can generate customized or personalized content to include in the web page, which can be returned to the browser 246 by the web server 213. For example, if the browser 246 sent a request to the web server 213 for a web page containing a list of available credit card offers, the personalization engine 216 could select one or more offers 227 to be provided in response.

The web server 213 can also provide a device identifier 239 (e.g., a cookie) and a session identifier 243 to the browser 246. The web server 213 can also provide the device identifier 239 and the session identifier 243 to the personalization engine 216. The personalization engine 216 can store the device identifier 239 and the session identifier 243 in conjunction with the offer identifier 229 of the offer 227 provided by the personalization engine 216 as a record of a personalized offer 103. If the offer 227 has one or more offer terms 233, the offer terms 233 made may also be stored in the personalized offer 103.

When the user of the browser 246 sends a subsequent request to the web server 213 for a web page, the web server 213 can detect the device identifier 239 and the session identifier 243 included in the subsequent request. The web server 213 can then search for a personalized offer 103 that matches the device identifier 239 and the session identifier 243 and return the personalized offer 103 in the response. As a result, the user of the browser 246 can consistently receive appropriate personalized content, such as personalized offers 103, for as long as the session represented by the session identifier 243 is valid.

However, the user of the browser 246 may also send a request to the web server 213 for more personalized content. For example, the user of the browser 246 could submit personally identifying information 253 through a user interface 100b to see which offers 227 the user would qualify for based on the personally identifying information 253. The personally identifying information 253 could be provided to the qualification engine 219, which could determine which offers 227 and offer terms 233 the user is qualified for based at least in part on a comparison of the personally identifying information 253 to the offer qualifications 236 of an individual offer 227. These offers could then be provided to the personalization engine 216.

The personalization engine 216 could then reconcile the personalized offers 103 that the user has been previously presented with the offers 227 (and offer terms 233) that the qualification engine 219 has determined that the user is eligible for. For example, if the user is qualified for better offer terms 233 (e.g., a higher introductory bonus or interest rate for a credit card or charge card), the personalization engine 216 could update the personalized offer 103 to reflect the better offer terms 233. As another example, if the personalization engine 216 determines that the user is not qualified for a previously made personalized offer 103, the personalization engine 216 could determine whether to continue to honor the personalized offer 103 that was previously made or update the personalized offer 103 to reflect the offer 227 and offer terms 233 that the user is actually qualified for. This decision could be made according to various implementation specific preferences or configurations.

When the user subsequently visits the website hosted by the web server 213, the web server 213 can continue to present the personalized offer(s) 103 to the user that match the device identifier 239 and the session identifier 243 provided by the browser 246. As a result, the user will continue to receive a consistent experience for the duration of the session represented by the session identifier 243, regardless of whether the user is logged into the website hosted by the web server 213 or is browsing anonymously or pseudonymously.

Figure 3:
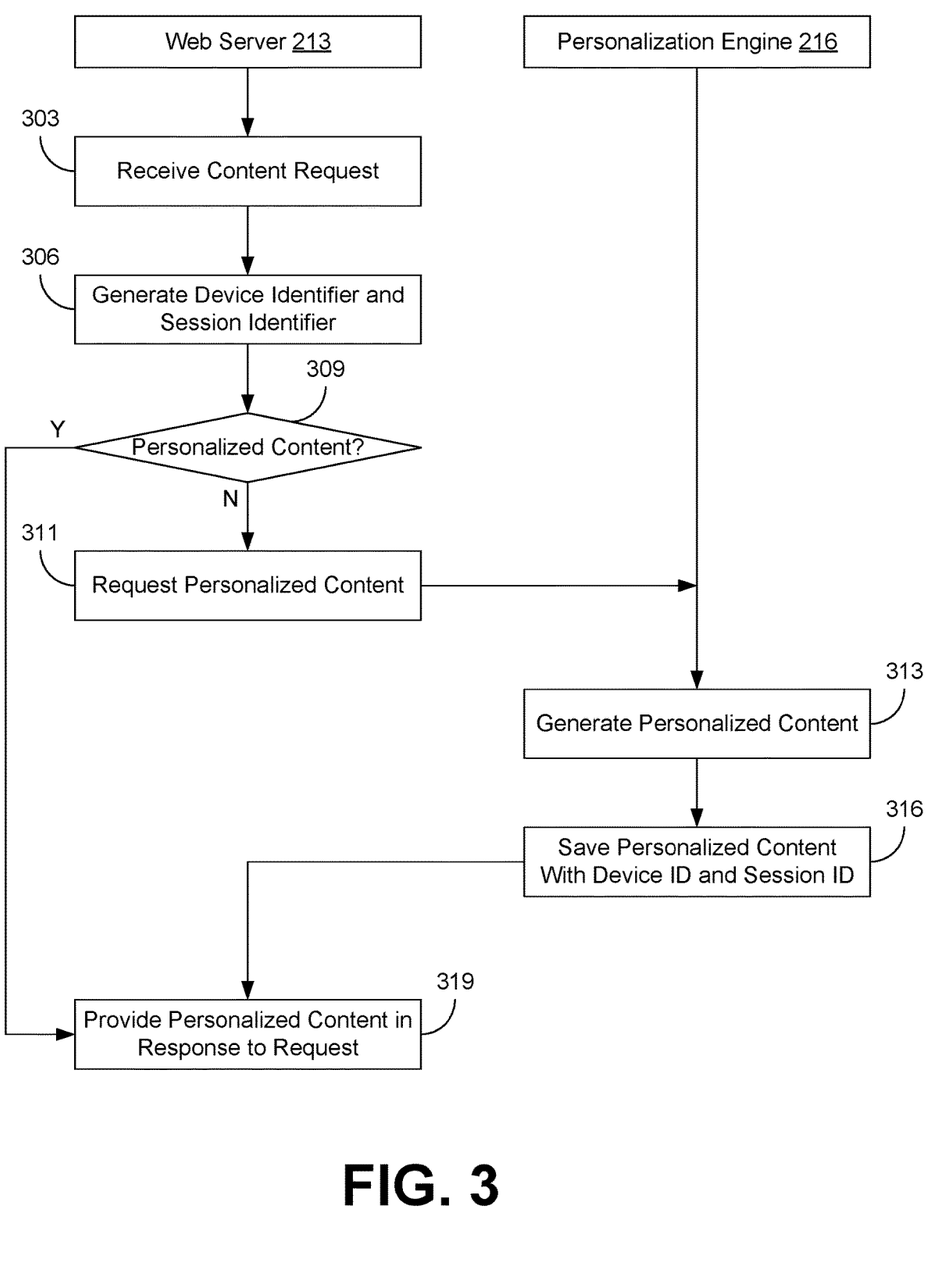
FIG. 3 is a sequence diagram illustrating one example of functionality implemented as portions of an application executed in a computing environment in the network environment of FIG. 2 according to various embodiments of the present disclosure.

Referring next to FIG. 3, shown is a sequence diagram that provides one example of the interaction between various components of the network environment 200. The sequence diagram of FIG. 3 provides merely an example of the many different types of functional arrangements that can be employed within the network environment 200. As an alternative, the sequence diagram of FIG. 3 can be viewed as depicting an example of elements of a method implemented within the network environment 200.

Beginning with block 303, the web server 213 can receive a content request from a browser 246, such as a request for a web page. For example, the web server 213 could request a web page showcasing or otherwise containing one or more offers 227 for goods or services, such as offers for credit or charge cards. The request for content can contain an internet protocol (IP) address of the client device 206, a device identifier 239, a session identifier 243, and/or potentially other data.

Then at block 306, the web server 213 can, in some instances, generate a device identifier 239 and/or a session identifier 243 for communication with the browser 246 of the client device 206. For instance, the web server 213 could create a device identifier 239 and/or a session identifier 243 if the request received at block 303 failed to contain a device identifier 239 and/or a session identifier 243. For example, the web server 213 could create a cookie or similar unique identifier and store it in a cache of the browser 246. Likewise, the web server 213 could create and return a session identifier 243 to the browser 246.

Next at block 309, the web server 213 can determine whether any valid or current personalized content, such as personalized offers 103, are available to provide in a response to the request received at block 303. For example, the web server 213 could search the data store 223 for any personalized offers 103 that match both the device identifier 239 of the client device 206 and the session identifier 243 of the current session. If no matching personalized offers 103 are found, then the process could proceed to block 311. If a matching personalized offer were found, then the process could instead proceed to block 319. In some implementations, the web server 213 may only search the data store 223 for personalized content, such as personalized offers 103, if neither a device identifier 239 nor a session identifier 243 were generated at block 306 because it follows that if web server had to provide a device identifier 239 or a session identifier 243 to the client device 206, then there could not be any personalized content, such as personalized offers 103, that are saved in the data store 223.

If the process proceeds to block 311, the web server 213 can send a request to the personalization engine 216 for personalized content for the user of the client device 206, such as one or more personalized offers 103. The request can include information such as the internet protocol (IP) address of the client device 206 that made the request for content at block 303, clickstream data 225 associated with the client device 206 collected by the web server 213, the device identifier 239 of the client device 206, and the session identifier 243 associated with the current session between the browser 246 of the client device 206 and the web server 213.

Moving on to block 313, the personalization engine 216 can generate personalized content, such as one or more personalized offers 103. This could be done using a variety of approaches. For example, the IP address of the client device 206 could be used for geolocation to determine the approximate location of the client device 206. The personalization engine 216 could then use the median or average annual income in that location as an estimate of the annual income of the user of the client device 206. As another example, the clickstream data 225 collected by the web server 213 could be used to identify browsing trends similar to other users. For example, if the clickstream data 225 indicates that a user is primarily focused on premium credit card or charge card offerings that require excellent credit, the personalization engine 216 could conclude that the user of the client device 206 is similar to other customers with excellent credit. The personalization engine 216 could then search for offers 227 with offer terms 233 and/or offer qualifications 236 that match the estimated annual income and estimated credit range of the user of the browser 246.

Then at block 316, the personalization engine 216 can then save the personalized content generated at block 313, such as personalized offers 103, to the data store 223. For example, the personalization engine 216 could then save one or more personalized offers 103 linked to the device identifier 239 and session identifier 243, where the personalized offers 103 include both the offer terms 233 to present to the user and the offer identifier 229 of the offer being presented. As previously discussed, the offer terms 223 could be saved in the form of offer flags that represent the level or tier of the offer 227 to be presented. Once saved, the personalization engine 216 can send a message or otherwise notify the web server 213 that the personalized content (e.g., the personalized offers 103) are available.

Finally, at block 319 the web server 213 can generate a web page that includes the personalized content (e.g., the personalized offers 103). The web page can then be returned to the browser 246 of the client device 103.

Figure 4:
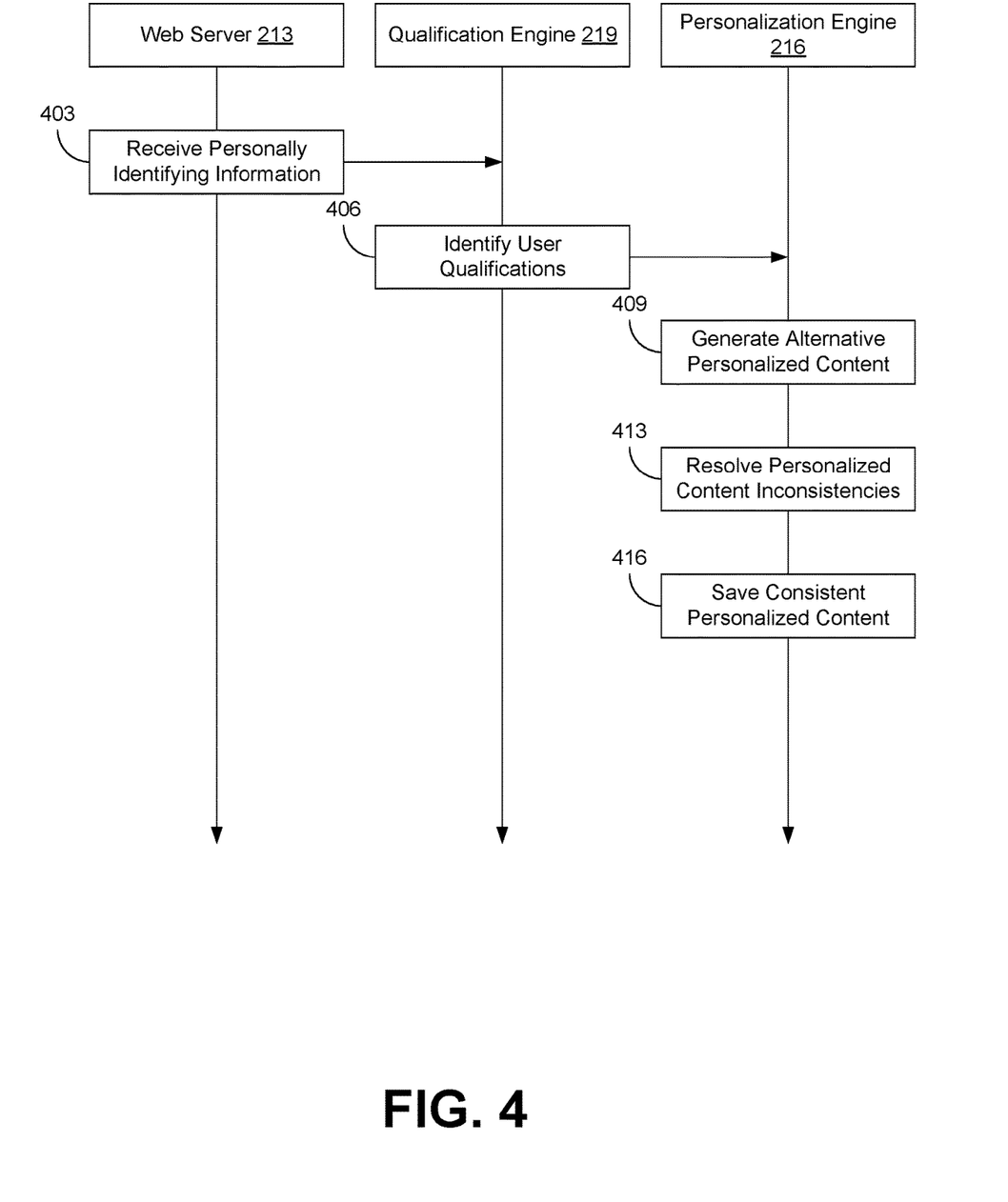
FIG. 4 is a sequence diagram illustrating one example of functionality implemented as portions of an application executed in a computing environment in the network environment of FIG. 2 according to various embodiments of the present disclosure.

Referring next to FIG. 4, shown is a sequence diagram that provides one example of the interaction between various components of the network environment 200. The sequence diagram of FIG. 4 provides merely an example of the many different types of functional arrangements that can be employed within the network environment 200. As an alternative, the sequence diagram of FIG. 4 can be viewed as depicting an example of elements of a method implemented within the network environment 200.

Beginning with block 403, the web server 213 can receive personally identifying information 253 from the browser 246 of the client device 103. For example, the user of the client device 206 may have accessed a web page (e.g., user interface 100*b*) through which he or she could submit personally identifying information 253 in order to see which content, such as offers 227, he or she was specifically qualified to receive. Once the web server 213 receives the personally identifying information 253, it can forward the personally identifying information 253 on to the qualification engine 219.

Then at block 406, the qualification engine 219 can evaluate the personally identifying information 253 to determine which content, such as offers 227, the user is qualified to receive. Using the example of credit or charge card offers 227, the qualification engine 219 could send the personally identifying information 253 to a credit bureau or credit agency to obtain a credit score, report, or rating that represents the payment history and likelihood of repayment of the user. This could also include, for example, evaluating the annual income provided by the user to determine whether the user has the financial ability to pay any annual fees associated with the credit or charge card, or to repay the principal and/or interest that might be accrued by the user. Once the user's qualifications are determined, such as the user's credit score or credit worthiness and ability to repay, the user's qualifications can be forwarded on to the personalization engine 216.

Next at block 409, the personalization engine 216 can generate alternative personalized content for the user. The personalized content can be considered to be alternative under the assumption that the user has already had one or more personalized offers 103 created on behalf of the user according to the sequence diagram of FIG. 3. However, it is possible that the user may have personalized content, such as personalized offers 103, created for the user for the first time according to the sequence diagram depicted in FIG. 4. In either event, the personalization engine 216 can generate what is termed alternative personalized content, such as alternative personalized offers 103, using the user qualifications provided by the qualification engine 219. For example, the personalization engine 216 could then search for offers 227 with offer qualifications 236 that match the credit score of the user or the reported annual income of the user. Any identified offers 227 would qualify as alternative personalized offers 103. However, the alternative personalized offers 103 generated at block 409 may be inconsistent with personalized offers 103 that have been previously generated according to the process depicted in the sequence diagram of FIG. 3.

Accordingly, at block 413, the personalization engine 216 can resolve any inconsistencies between the personalized offers 103 generated previously according to the process of FIG. 3 and those alternative personalized offers 103 generated at block 409. As a simplistic example, the personalization engine 216 could elect to replace all previously generated personalized offers 103 with those created at block 409. As another example, the personalization engine 216 could compare the previously generated personalized offer 103 and the alternative personalized offer 103, and elect the one with the offer terms 233 that were most generous or most favorable to the user in order to provide for a positive user experience. Once the inconsistencies are resolved, the offer identifier 229 and offer terms 233 (e.g., offer flags) can be selected to save to the data store 223 as the consistent personalized offers 103.

Then at block 416, the personalization engine 216 can save the consistent personalized content (e.g., the consistent personalized offers 103) to the data store 223. In some instances, the personalization engine 216 could overwrite or replace a previous personalized offer 103 with a matching device identifier 239 and session identifier 243 with the consistent personalized offer 103 with the same device identifier 239 and session identifier 243. In other instances, the personalization engine 216 could save the consistent personalized offer 103 as a new personalized offer 103 to the data store 223.

After the consistent personalized content (e.g., the consistent personalized offers 103) have been saved to the data store 227, they can be accessed by the browser 246 of the client device 206 as previously described in blocks 303, 309, and 319 of the sequence diagram of FIG. 3. For instance, when the browser 246 provides the web server 213 with a request for content, the web server 213 can search the data store 223 for personalized offers 103 with a matching device identifier 239 and session identifier 243. The personalized offers 103 that would be returned would be the consistent personalized offers 103 saved to the data store 223 previously at block 416 in the sequence diagram of FIG. 4. As a result, the user would receive the same consistent personalized offers 103 for which he or she was qualified to receive, regardless of the channel in which the user viewed offers 227 generally.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and machine-readable instructions stored in the memory that, when executed by the processor, cause the computing device to at least:
receive a first content request from a user device, the first content request comprising a unique device identifier, a session identifier, and a network address;
generate personalized content based at least in part on the network address, the personalized content comprising a first set of offer terms;
save the personalized content in association with the unique device identifier and the session identifier;
provide the personalized content to the user device in response to the first content request;
receive a second content request from the user device, the second content request comprising the unique device identifier, the session identifier, and personally identifying information (PII);
search for the saved personalized content using the unique device identifier and the session identifier;
generate alternative personalized content using the PII, the alternative personalized content comprising a second set of offer terms, wherein the second set of offer terms comprises at least one offer term that is not included the first set of offer terms;
resolve an inconsistency between the personalized content and the alternative personalized content to generate consistent personalized content by at least:
comparing the first set of offer terms of the personalized content and the second set of offer terms of the alternative personalized content; and
electing one of the personalized content or the alternative personalized content to become the consistent personalized content based at least on the comparison of the first set of offer terms of the personalized content and the second set of offer terms of the alternative personalized content; and
provide the consistent personalized content to the user device in response to the second content request.

2. The system of claim 1, wherein the machine-readable instructions that cause the computing device to resolve an inconsistency between the personalized content and the alternative personalized content further cause the computing device to determine that a user associated with the PII was unqualified to receive the saved personalized content.

3. The system of claim 1, wherein the machine-readable instructions, when executed by the processor, further cause the computing device to at least:
replace the personalized content saved in association with the unique identifier and the session identifier with the consistent personalized content by saving the consistent personalized content in association with the unique identifier and the session identifier;
receive a third content request from the user device, the third content request comprising the unique device identifier and the session identifier and omitting the PII;
search for the consistent personalized content using the unique device identifier and the session identifier; and
provide the consistent personalized content to the user device in response to the third content request.

4. The system of claim 1, wherein the machine-readable instructions that cause the computing device to generate the personalized content based at least in part on the network address further cause the computing device to at least:
estimate a user qualification based at least in part on a geographic location associated with the network address; and
identify one or more instances of content that matches the estimated user qualification.

5. The system of claim 1, wherein the machine-readable instructions that cause the computing device to generate the alternative personalized content using the PII further cause the computing device to at least:
send the PII to a qualification engine;
receive one or more qualifications from the qualification engine; and
generate the alternative personalized content by identifying one or more instances of content that matches one or more of the one or more qualifications received from the qualification engine.

6. The system of claim 1, wherein the machine-readable instructions, when executed by the processor, further cause the computing device to at least:
collect clickstream data associated with the user device; and
generate the personalized content based at least in further part on the clickstream data.

7. The system of claim 1, wherein the personalized content, saved personalized content, alternative personalized content, and consistent personalized content are represented in part using one or more content flags.

8. A method, comprising:
receiving a first content request from a user device, the first content request comprising a unique device identifier, a session identifier, and a network address;
generating personalized content based at least in part on the network address, the personalized content comprising a first set of offer terms;
saving the personalized content in association with the unique device identifier and the session identifier;
providing the personalized content to the user device in response to the first content request;
receiving a second content request from the user device, the second content request comprising the unique device identifier, the session identifier, and personally identifying information (PII);
searching for the saved personalized content using the unique device identifier and the session identifier;
generating alternative personalized content using PII, the alternative personalized content comprising a second set of offer terms, wherein the second set of offer terms comprises at least one offer term that is not included the first set of offer terms;
resolving an inconsistency between the personalized content and the alternative personalized content to generate consistent personalized content by at least:
comparing the first set of offer terms of the personalized content and the second set of offer terms of the alternative personalized content; and
electing one of the personalized content or the alternative personalized content to become the consistent personalized content based at least on the comparison of the first set of offer terms of the personalized content and the second set of offer terms of the alternative personalized content; and
providing the consistent personalized content to the user device in response to the second content request.

9. The method of claim 8, wherein resolving an inconsistency between the personalized content and the alternative personalized content further comprises determining that a user associated with the PII was unqualified to receive the saved personalized content.

10. The method of claim 8, further comprising:
replacing the personalized content saved in association with the unique identifier and the session identifier with the consistent personalized content by saving the consistent personalized content in association with the unique identifier and the session identifier;
receiving a third content request from the user device, the third content request comprising the unique device identifier and the session identifier and omitting the PII;
searching for the consistent personalized content using the unique device identifier and the session identifier; and
providing the consistent personalized content to the user device in response to the third content request.

11. The method of claim 8, wherein generating the alternative personalized content using the PII further comprises:
sending the PII to a qualification engine;
receiving one or more qualifications from the qualification engine; and
generating the alternative personalized content by identifying one or more instances of content that matches one or more of the one or more qualifications received from the qualification engine.

12. The method of claim 8, wherein generating the personalized content based at least in part on the network address further comprises:
estimating a user qualification based at least in part on a geographic location associated with the network address; and
identifying one or more instances of content that matches the estimated user qualification.

13. The method of claim 8, further comprising:
collecting clickstream data associated with the user device; and
generating the personalized content based at least in further part on the clickstream data.

14. The method of claim 8, wherein the personalized content, saved personalized content, alternative personalized content, and consistent personalized content are represented in part using one or more content flags.

15. A non-transitory, computer-readable medium, comprising machine-readable instructions that, when executed by a processor of a computing device, cause the computing device to at least:
receive a first content request from the user device, the first content request comprising the unique device identifier, the session identifier, and personally identifying information (PII);
generate personalized content based at least in part on the PII, the personalized content comprising a first set of offer terms;
save the personalized content in association with the unique device identifier and the session identifier;
provide the personalized content to the user device in response to the first content request;
receive a second content request from the user device, the second content request comprising the unique device identifier and the session identifier, and a network address;
retrieve the saved personalized content using the unique device identifier and the session identifier;
generate alternative personalized content using the network address, the alternative personalized content comprising a second set of offer terms, wherein the second set of offer terms comprises at least one offer term that is not included the first set of offer terms;
resolve an inconsistency between the personalized content and the alternative personalized content to generate consistent personalized content by at least:
comparing the first set of offer terms of the personalized content and the second set of offer terms of the alternative personalized content; and
electing one of the personalized content or the alternative personalized content to become the consistent personalized content based at least on the comparison of the first set of offer terms of the personalized content and the second set of offer terms of the alternative personalized content; and
provide the consistent personalized content to the user device in response to the second content request.

16. The non-transitory, computer-readable medium of claim 15, wherein the machine-readable instructions that cause the computing device to retrieve the saved personalized content using the unique device identifier and the session identifier further cause the computing device to at least:
determine that the session identifier is unexpired; and
retrieve the saved personalized content in response to a determination that the session identifier unexpired.

17. The non-transitory, computer-readable medium of claim 15, wherein the unique device identifier is a browser cookie.

18. The non-transitory, computer-readable medium of claim 15, wherein the personalized content is represented using one or more content flags.

19. The non-transitory, computer-readable medium of claim 15, wherein the machine-readable instructions that cause the computing device to generate the personalized content using the PII further cause the computing device to at least:
send the PII to a qualification engine;
receive one or more qualifications from the qualification engine; and
generate the personalized content by identifying one or more instances of content that matches one or more of the one or more qualifications received from the qualification engine.

20. The non-transitory, computer-readable medium of claim 15, wherein the machine-readable instructions, when executed by the processor, further cause the computing device to at least:
collect clickstream data associated with the user device; and
generate the personalized content based at least in further part on the clickstream data.

* * * * *